July 31, 1962 J. C. MARINACE 3,047,438

EPITAXIAL SEMICONDUCTOR DEPOSITION AND APPARATUS

Filed May 28, 1959 3 Sheets-Sheet 1

INVENTOR
JOHN C. MARINACE

BY Alvin J. Riddles
ATTORNEY

United States Patent Office 3,047,438 Patented July 31, 1962

3,047,438
EPITAXIAL SEMICONDUCTOR DEPOSITION AND APPARATUS

John C. Marinace, Yorktown Heights, N.Y., assignor to International Business Machines Corporation, New York, N.Y., a corporation of New York Filed May 28, 1959, Ser. No. 816,572
10 Claims. (Cl. 148—1.5)

This invention relates to the formation of bodies of semiconductor material, and in particular to the transportation and deposition of semiconductor material by halide decomposition.

In the development of the art of semiconductor devices, it has been found in a number of cases to be desirable to have the physical dimensions of the body of the semiconductor material from which the device was made very small and the purity of the semiconductor material and the degree of crystalline perfection maintained to a very high degree.

Device fabrication thus far in the art, has been accomplished by growing a single crystal of semiconductor material in the form of an ingot and then dicing it so as to establish the desired device dimensions. In the growing of the crystalline ingot very careful control of the environmental conditions and of the purity of the materials must be maintained in order to control resistivity and the crystalline perfection of the semiconductor material. Recently, in addition to the requirement for a precise degree of purity, it has also been found to be desirable to provide specific quantities of impurities in precisely known gradations from one portion of the material to another and even to provide single crystals of one material in one region and another material in another region.

The problems associated with the fabrication of devices to meet all of these requirements simultaneously are becoming increasingly more difficult to surmount as the requirements upon device performance have increased.

What has been discovered is a technique of transport and deposition of semiconductor material through the decomposition of a halide compound of a semiconductor material wherein a precisely controllable deposit of a semiconductor material may be acquired. The deposit has a higher degree of crystalline perfection than has been known previously in the art and the deposit is completely controllable with respect to the quantity and gradation of deliberately introduced conductivity type determining impurities placed in the crystal during the deposition operation.

Specifically, the technique of semiconductor body formation of this invention involves a closed sealed tube containing a halide transporting element wherein a difference in temperature is maintained between the semiconductor material and the transport element, and a substrate upon which the semiconductor body is to be formed.

The technique of this invention as will be pointed out in the following description provides the following advantages and attendant device features.

It permits complete matrices of semiconductor devices to be formed in a single operation.

It permits very small dimensions to be maintained in devices being fabricated so that very accurately controlled transistor base region thicknesses are possible.

It permits contacts to be made to thin layers in semiconductor bodies so that external circuit connections may be made to very narrow regions of a device.

It permits complete flexibility as to the composition, the rate of introduction and the gradient of concentration of conductivity type determining impurities introduced into the deposited semiconductor material so that such parameters as spreading resistance "drift" fields, capacitance, and avalanche breakdown values in a device may be subject to control.

It permits the fabrication of semiconductor devices of more than one semiconductor material thereby making available devices with a difference in band energy gap width within the semiconductor body.

It permits the formation of semiconductor bodies at a lower temperature than heretofore in the art providing a reduced degree of crystalline imperfection in the bodies.

It permits the formation of semiconductor bodies at a slower rate than heretofore in the art so that more precise dimensional control and fewer crystalline imperfections are encountered in the deposited semiconductor material.

It is an object of this invention to provide an improved technique of forming semiconductor bodies.

It is another object of this invention to provide an improved method for fabricating semiconductor bodies having contiguous zones of opposite conductivity type.

It is another object of this invention to provide an improved method for fabricating semiconductor bodies by depositing a film or coating of one conductivity type semiconductor material upon semiconductor material of an opposite conductivity type and wherein the crystalline structure and characteristics of the deposited film or coating may be accurately controlled.

It is a further object of this invention to provide an improved method of fabricating PN junctions in semicondutcor materials by deposition.

It is another object of this invention to provide a sealed tube, halide transport, deposition reaction.

It is another object of this invention to provide a sealed tube thermal gradient, halide transport deposition method of forming complex semiconductor bodies.

It is another object of this invention to provide an improved technique of forming connections to thin base regions of transistors.

It is another object of this invention to provide an improved heating furnace for semiconductor material.

It is another object of this invention to provide an improved semiconductor body deposition reaction apparatus.

Other objects of the invention will be pointed out in the following description and claims and illustrated in the accompanying drawings, which disclose by way of example, the principle of the invention and the best mode which has been contemplated of applying that principle.

Figure 1:
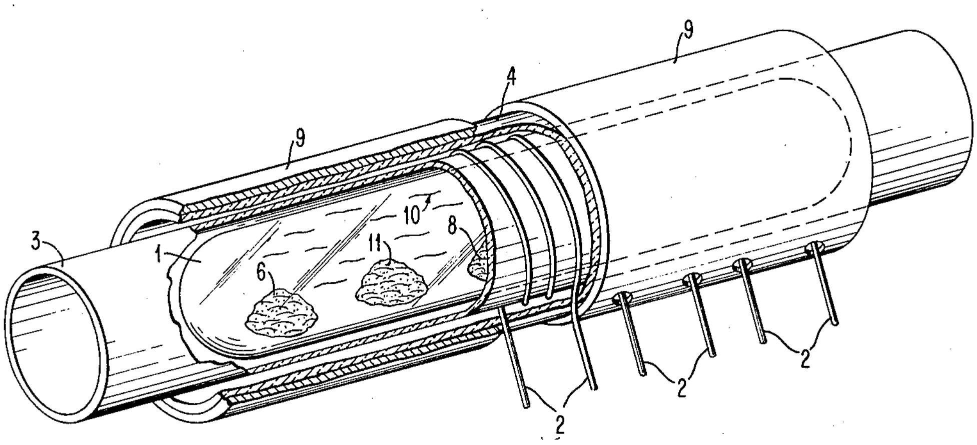
FIGURE 1 is a view of an apparatus for forming semiconductor bodies in accordance with the invention.
Figure 1A:
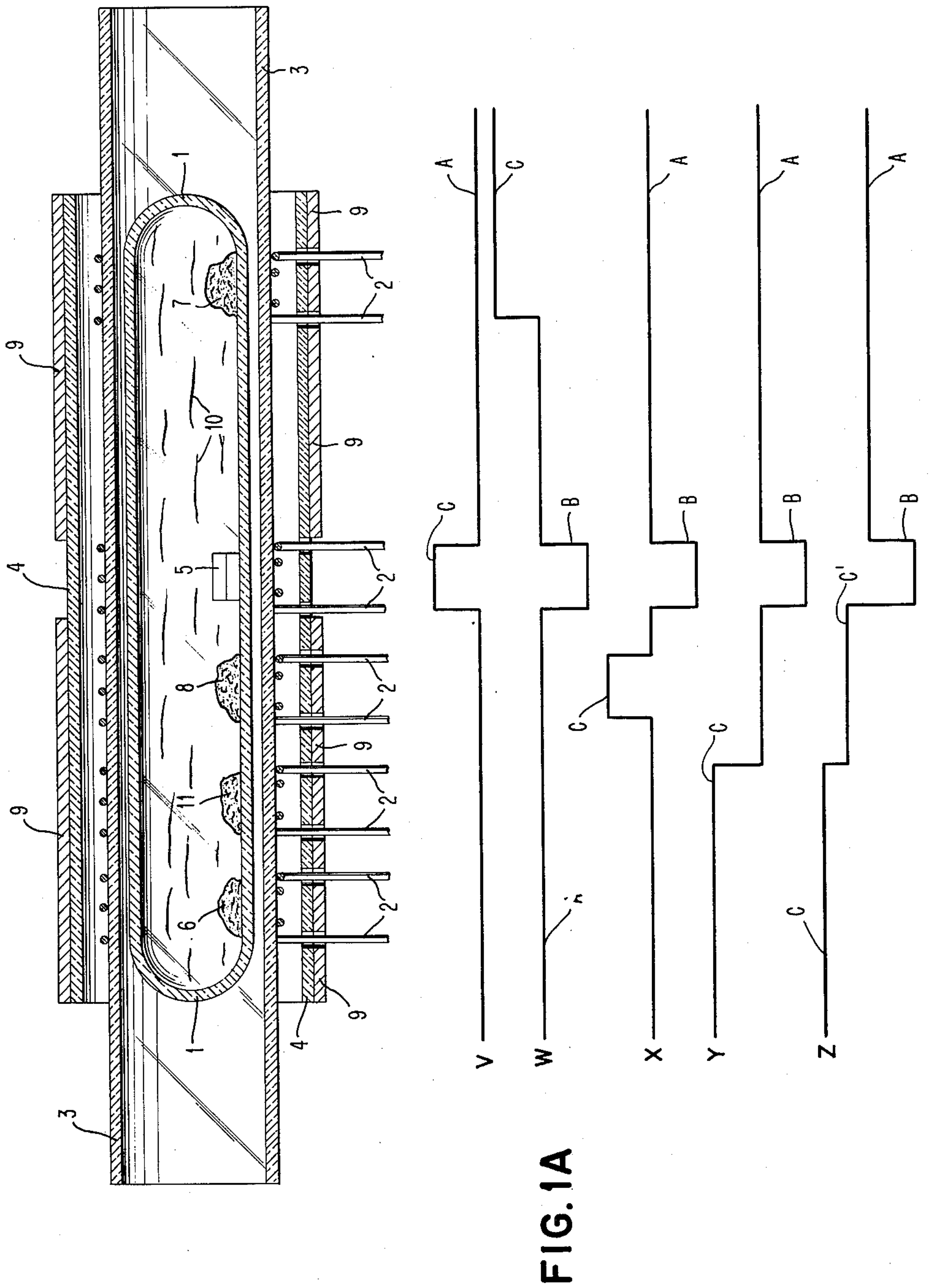
FIGURE 1A is a cross-sectional view of the apparatus of FIGURE 1. The view of FIGURE 1A includes the materials in the temperature controlling furnace involved in the invention and a number of graphs illustrating temperature distribution in the apparatus shown when fabricating semiconductor bodies in accordance with the invention.

Referring to FIGURES 1 and 1A, a sealed container 1 is provided of a non-reacting material such as quartz. The container controls the environment surrounding the material involved in the formation of the semiconductor bodies in connection with the invention. The container 1 is illustrated as transparent for reasons associated with visibility and, if needed, the use of focused light for providing a temperature difference inside the container. Sources of heat, illustrated as resistive coils 2, are provided surrounding the tube in uniform spacing in order to establish a desired elevated temperature profile within the container. The coils 2 are wound around a quartz furnace tube 3. A quartz insulating jacket 4 envelopes the coil region of the furnace tube. A quantity of material which will serve as a substrate 5 on which semiconductor material will be deposited is positioned in the container at a point which may be made the point of lower or higher temperature. For purposes of illustration, its position is shown as near the center of the container 1, however, as will be apparent from subsequent discussion, the substrate position in the container is not critical. A quantity of source semiconductor material 6 containing impurities capable of imparting a particular conductivity type for example, N type, is positioned at one portion of the container, and another quantity of semiconductor material 7 containing impurities capable of imparting the opposite (P) conductivity type is positioned at another portion of the container. Where the container 1 is elongated, the sources 6 and 7 are conveniently positioned at opposite ends with the substrate 5 near the center as illustrated. For a further illustration of the control that can be exercised with the process, a source 8 of intrinsic semiconductor material is also positioned in the container. In order to illustrate the fact that the position of the sources 6, 7, and 8 with respect to the substrate 5 is not critical, source 8 has been shown placed between source 6 and the substrate 5. As will be apparent from later discussion, it is critical to have a control over a temperature difference between each source and the substrate.

In accordance with the invention, a desired elevated temperature profile is maintained in the entire container 1 through the coils 2, and further means are provided for raising and lowering the temperature in a selectable particular portion of the container 1 with respect to the level of the remainder. The means for the selected region temperature increase may be provided by varying the power applied to particular coils or be provided through the use of high intensity focused light from sources such as paraboloid reflectors not shown which are focused when in operation to concentrate a high intensity light on a small area and thereby to raise the temperature of either the substrate 5 or one or more of the sources 6, 7, or 8. The means for keeping the temperature in the region of the substrate lower than the raminder of the container is provided by the positioning of heat reflectors around all portions of the tube except where a low temperature is required. The heat reflectors are illustrated as a covering 9 in FIGURES 1 and 1A and can conveniently be made of metal foil.

The container 1 is provided with an oxidation controlling environment such as hydrogen, helium or merely evacuated. The environment in the tube is shown schematically as a gas 10. A quantity of a transport element 11, which preferably may be pure iodine, or germanium tetra iodide is placed within the tube at a location such that only a minimum amount is lost by evaporation during evacuating and sealing the container and the location is at a different temperature than the substrate.

In the formation of the semiconductor bodies in accordance with the invention, the temperature distribution or temperature profile of the entire container 1 is established by application of heat sources such as the heating coils 2. This temperature profile may be considered as being reckoned from some base temperature A, as shown in FIGURE 1A. The temperature A is governed as an upper limit by the desired speed of deposition and the temperature at which thermal damage may occur to the substrate 5; and, as a lower limit the temperature A, as will be later explained, is governed by maintaining a temperature to insure transportation of the source material.

The substrate 5 is held at a different temperature from either the sources 6, 7, or 8 and the steady temperature A.

It has been found that the invention operates with a pyrolytic or disproportionation type or reaction. In the disproportionation type of reaction, the substrate 5 is maintained at the lowest temperature point in the container 1 and at a temperature above the temperature at which the transport element 11 is included in the deposition; and in the pyrolytic type reaction, the substrate 5 is maintained at the highest temperature point in the container below the temperature at which at thermal damage to the substrate 5 may occur. It has been found in the disproportionation type reaction that disposition proceeds most rapidly when the substrate 5 is slightly above the temperature at which the transport element 11 is included in the deposited material. The substrate temperature at the coolest point of the container 1 is labelled B.

The disproportionation type of reaction as will be described in Example A, is very efficient in that heavy deposits are achieved in short times. This type of reaction for maximum deposition rate requires close control of temperature and vapor pressure since the temperature must be maintained between a high and low value. The disproportionation type of reaction is sharply reduced in rate at a temperature sufficient to decompose pyrolytically the compound of the transport element and the semiconductor material.

The pyrolytic type reaction as will be described in Example B operates at temperatures essentially beyond those at which the disproportionation type of reaction operates since the pyrolytic type of reaction depends upon the decomposition of the compound of the transport element and the semiconductor material. The temperature control requirements in the pyrolytic type of reaction are not as critical as those of the disproportionation type of reaction.

With respect to the disproportionation type of reaction, the transport element 11 in the container 1 vaporizes at temperature A and mingles with the environment 10.

In order to insure a surface for deposition that is free of contamination, the surface of the substrate may be conditioned by reversing the deposition operation. To accomplish this, the temperature of the substrate 5 is raised to a higher temperature than the rest of the elements in the container 1 by increasing the power input to the set of coils 2 surrounding the substrate 5. This adds an increment of temperature C to the substrate 5 as shown by curve V of FIGURE 1A. The substrate 5 being at the higher temperature enters into a reaction with the vaporized transport element 10 forming a vaporized compound of the transport element 11 and the substrate 5 material.

Under these conditions, the material of the substrate 5 is transported away from the higher temperature region of the container 1 and is deposited in a lower temperature region of the container 1 which may be an empty "dump zone" or one of the source zones, depending upon the type of impurity in the substrate 5.

The purpose of this step in the operation is to insure a very clean surface on the substrate, completely free of contamination so that the deposition of the semiconductor material may be made in a more nearly perfect interface. This transportation operation operates in a similar manner to "etching."

When the substrate 5 has been "etched" to the extent to sufficiently insure cleanliness on the surface, the tempetrature distribution in the container 1 is changed so as to cause the substrate to be at the lowest temperature point in the container 1 and one of the desired sources of material 6, 7, or 8 to be at the highest temperature point in the tube 1. The highest temperature point is labelled C in FIGURE 1A.

Assuming it to be desirable to deposit P conductivity type semiconductor material first, the temperature distribution in the container 1 is altered by increasing the power to the coil 2 surrounding the P type source semiconductor 7 and reducing the temperature slightly to the lowest level B by reducing the power to the coil 2 surrounding substrate 5.

Under the conditions illustrated by curve W of FIGURE 1A the P conductivity type semiconductor material from the source 7 is tranpsorted from the higher temperature region C at source 7 to the lower temperature region B at the substrate 5 where it is epitaxially deposited as pure semiconductor material on the substrate 5. In other words the transported semiconductor material forms a larger semiconductor body extending from and maintaining the same crystalline orientation and periodicity that was characteristic of the substrate 5. As is illustrated in curve W, the temperature is highest in the vicinity of the source 7 and the substrate 5 is maintained at the lowest temperature so that the epitaxial deposit may occur at this point. The base temperature A is slightly above B. The temperature difference between the source semiconductor material and the substrate upon which the deposit is to be made may vary to a certain degree; however, it has been found that at higher substrate temperatures in a disproportionation type of reaction the rate of deposition is slower. The deposition is most rapid and efficient at a point very near, but above, the temperature at which some of the vaporized transport element is also deposited as inclusions within the semiconductor material on the substrate 5. As has been discussed, the upper temperature limit is determined by the desired rate of deposition and the particular semiconductor material involved. The lower temperature limit is determined by the particular semiconductor material involved and the temperature at which the particular transport element becomes included in the deposited semiconductor material under the physical conditions of pressure and temperature existing in the container 1 during the formation of the semiconductor bodies.

Upon depositing a layer of P conductivity type semiconductor material on the substrate 5, it may be desirable to continue depositing layers of other conductivity types on the same substrate, thereby fabricating complete devices, arrays of devices having PN junctions and varying conductivity type impurity gradients. As a continued illustration, a quantity of intrinsic semiconductor material is included as a source and labelled element 8. By maintaining the substrate 5 at the lowest temperature point in the system and increasing the temperature of the material 8 by increasing the power to the coils 2 surrounding the material 8, it is possible to transport the intrinsic semiconductor material 8 and deposit it on the substrate 5. The temperature profile in the container 1 for this purpose is shown as curve X, with the high temperature region C in the vicinity of the source 8 and the loweest temperature region B at the substrate 5.

Upon completion of the deposition of the intrinsic layer, the temperature profile may again be shifted by increasing the power to the coils 2 surrounding the source material 6. Material from source 6 having an N conductivity type, is transported to the substrate 5 under temperature condition as shown in connection with the curve Y where the region at source 6 is at temperature C and the region of the substrate 5 is at temperature B. The structure resulting from these depositions is made up of layers of P and N conductivity type separated by a region of intrinsic semiconductor material.

To provide concentration gradients of impurities the N type source 6 of P type source 7 may be diluted with the efflux from intrinsic material 8, whose temperature would vary with time while the other temperatures are constant as may be seen in profile curve Z. Thus fabrication of one portion of the PNP transistor known in the art has been illustrated.

The formation of the second P region of such a transistor has not been shown but it will be apparent that re-establishing the temperature profile described by curve W will accomplish this.

In accordance with the invention as illustrated in connection with FIGURES 1 and 1A, a very close control of the temperature is maintained, so that the rates of transport and deposition on the substrate may be very precisely controlled. With the precise control achieved through this invention, many layered structures and matrices of structures are made in a single temperature cycle and the content of the deposit may be very precisely controlled. The quantity of P or N conductivity type impurity included in the deposited semiconductor material may be varied by controlled vaporization of a source as the deposition is increased, so that not only configurations of N and P conductivity type structures may be achieved with the process of this invention but as described gradations of conductivity in the material itself and very precise thickness depositions may be achieved.

In order to provide a clear illustration, liberty has been taken with the scale of the drawings of the figures, however in order to establish a proper perspective of the quantity of material transported and the degree of control achieved, the following actual figures are provided. In a disproportionation type reaction operation involving germanium, the substrate in increased in thickness at a rate varying approximately one to fifteen microns per hour where the transport element is an iodine compound of germanium. The faster rates are achieved at the lowest usable temperature and, by increasing the quantity of halide transport provided in the reaction. The substrate is maintained at about 400° C. and is about 120° to 150° C. lower in temperature than the source.

Figure 2:
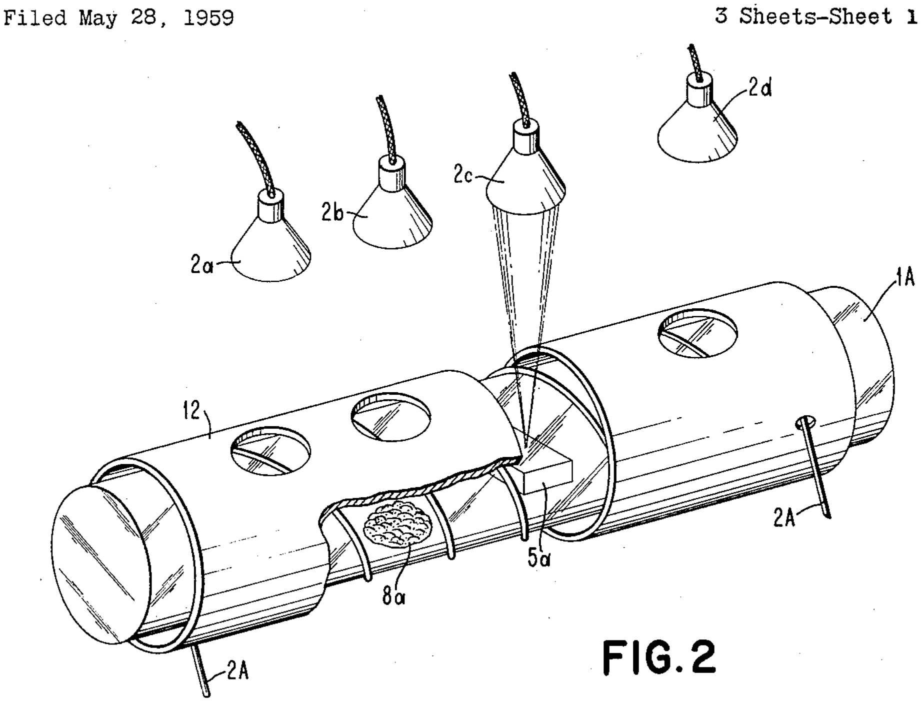
FIGURE 2 is an illustration of a modified apparatus for performing the invention.

Referring now to FIGURE 2 a view is provided of an alternate method of construction of the furnace for providing the variable temperature profile in the sealed container required by the invention. In FIGURE 2 a container labelled element 1A is provided with a temperature coil 2A as in FIGURES 1 and 1A. A heat reflector 12 is positioned over the container 1 and is equipped with a plurality of openings for each separate temperature location. A plurality of lights $2_a$–$2_d$ are provided for each site in FIGURES 1 and 1A each of which includes a parabolic reflector for focusing light on a separate location inside the container 1. Selective application of power to the lights $2_a$–$2_d$ serves the function to raise the temperature in the various locations or sites in the reaction.

Figure 3:
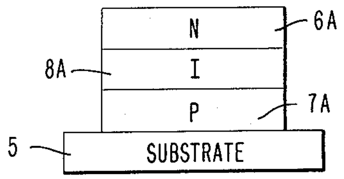
FIGURE 3 is an illustration of a PIN semiconductor structure made employing the invention.

Referring next to FIGURE 3, the structure formed by the invention illustrated in connection with FIGURES 1 and 1A is shown wherein the substrate 5 is first provided with a layer of P conductivity type material deposited from the source 7, the layer is labelled element 7A using the temperature profile shown by curve W. A layer of intrinsic semiconductor material was next deposited on the layer 7A and is labelled element 8A, while the temperature profile in the container 1 was maintained as illustrated in curve X of FIGURE 1A. When the curve Y of FIGURE 1A is established, an N conductivity type layer of semiconductor material labelled 6A is deposited on the layer 8A. The substrate may be of any desired conductivity type and thus serve as a portion of the ultimate structure. For example, assuming the substrate 5 of FIGURE 3 to be N conductivity type the structure would be an NPIN transistor known in the art.

Figure 4:
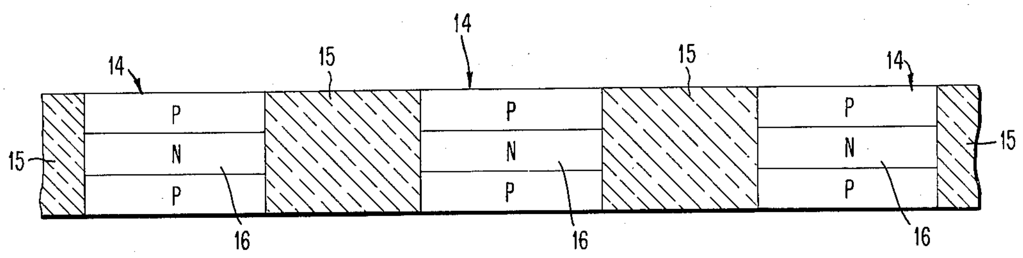
FIGURE 4 is an illustration of an intermediate process step in making devices in accordance with the invention.

Referring next to FIGURE 4, a series of semiconductor structures of the type fabricated in connection with FIGURE 3, are shown but differing in that standard PNP type transistor configurations are illustrated.

It is possible through the versatility and control of this invention to form any specific configuration of semiconductor material and the structures of FIGURE 4 and that discussed in connection with FIGURE 1A are illustrations. FIGURE 4 also illustrates the fabrication of a plurality of structures or a matrix simultaneously. The PNP type transistors 14 are in a masking fixture 15 of a non-reacting material having a coefficient of expansion match fairly close to the particular semiconductor material being handled, for example, some glasses have a close coefficient of expansion match for germanium.

Figure 5:
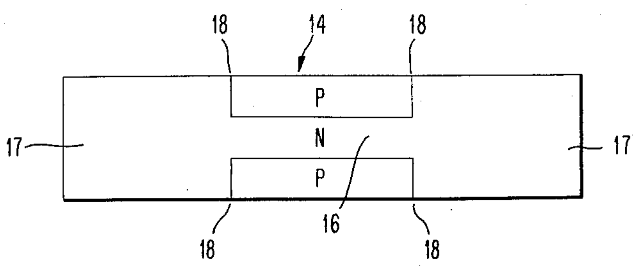
FIGURE 5 is an illustration of a connection to a thin layer employing the invention.

With such a masking arrangement many discrete areas may be simultaneously deposited with the unwanted deposit falling on the mask so that many devices may be built up on a single substrate in one deposition operation, and as another example, connections to thin conductivity type regions such as transistor bases is greatly facilitated by the technique of this invention. In connection with transistor base connections, it is often difficult to make satisfactory contact to the thin center regions of some semiconductor structures. In the past, connections to these thin regions have been made by forming an alloy which forms a PN junction with the adjacent conductivity type regions. However, alloy connections are characteristically of very low resistivity type material, and create performance disadvantages such as uncontrollable resistance variations, avalanche breakdown and variations in capacitance. The technique of this invention may be employed to make matrices and these connections as follows:

Employing the technique of this invention a semiconductor NPN or PNP structure has its edges etched clean by an etching operation involving the commonly used liquid etches such as $CP_4$, white etch, etc., the faces of the structure being masked by a non-reacting element 15 which may be a wax or similar substance. The device 14 is then subjected to an epitaxial deposition of the conductivity type semiconductor material of the central or base region 16, which in this illustration is N conductivity type. This material deposit as shown in FIGURE 5 so that a region of N conductivity type 17 builds up over the surface, forming epitaxially deposited junctions labelled 18 over the entire external or P regions of the device. The N type material that deposits on the faces of the devices can be lapped off in a later operation.

Since the technique of the invention involves a complete and precise control of all items subject to variation not only the type and quantity of the semiconductor material but also the resistivity of the material is controllable so that specific and precisely predictable base resistances of such devices may then be achieved, and, as a secondary effect since this resistivity is precisely controllable a control is had on the capacity of the junctions associated with the deposited region. In the deposition technique of this invention, it is advantageous to have a very close control over the temperature of the reaction taking place at the various portions of the sealed system. This may be accomplished in accordance with the invention by the furnaces illustrated in connection with FIGURES 1 and 2. Such a furnace has a number of advantages in this type of process. Many times it is advantageous to watch what is going on in a furnace. For example, numerous chemical reactions can be controlled best by simply watching the whole site of the chemical reaction. This is especially true of many vapor solvent reactions. An ordinary furnace is usually opaque, watching a reaction therein becomes quite difficult even if a furnace is fitted with openings through which one may look. These are necessarily quite small otherwise they would disturb the desired temperature distribution in the furnace. Further, inductive coupling for heating furnaces has been difficult to control with high precision. The furnace used in connection with this invention as is illustrated in FIGURES 1 and 2, is made up of a tube of transparent refractory material such as fused quartz. Around the outside of the tube resistance heating material is spirally wound with the turns of the spiral sufficiently far apart to permit easy vision to the interior of the tube. The spacing between the turns of the winding is advantageous such that the reaction may be observed between the turns of the winding or light, as shown in FIGURE 2, or intermediate turns of further windings, as shown in FIGURE 1A, may be provided in order to vary the temperature gradient inside the tube. Reflectors such as element 9 of FIGURE 1 and element 12 of FIGURE 2 also operate to concentrate heat at a particular spot.

When light is employed, a hyperbolic reflector such as shown in FIGURE 2, may provide heat by focusing the light through the side of the tube on the place where it is desired to raise the temperature. The light also has the additional advantage of being able to heat only the material and not the container. Through medium of control provided by the wide spacings between the turns of the furnace as illustrated in FIGURES 1, 1A and 2, and with the selective introduction of light, a control may be had on light sensitive reactions whereby it is possible to introduce light of the desired wave length through the transparent or translucent containers to supply energy to the reaction.

While the invention has been illustrated thus far in terms of a disproportionation type transport and deposition reaction wherein the semiconductor material is moved from a source at a higher temperature, to a substrate at a lower temperature a specific example of which is given below in Example A, it has been found that the invention may also be employed in a pyrolytic type of transport and deposition reaction wherein the semiconductor material is moved from a source at a lower temperature to a substrate at a higher temperature. A specific example of this type of reaction is given below in Example B.

In accordance with the invention superior semiconductor bodies may be formed by providing at least one source and at least one substrate at separated positions in a sealed even high temperature container containing a vaporized transport element and by establishing differences in temperature with a reaction range in the container between the regions occupied by the substrate and the source.

While the physical and chemical mechanism by which the deposition in connection with the invention takes place has not definitely been established, the following theoretical information is provided to enable one skilled in the art to better comprehend the invention and how it is applied.

It is considered that the disproportionation type of reaction may be represented chemically for germanium and iodine by the following equation:

$$2GeI_2 \underset{(gas)}{\rightleftarrows} 2GeI_2 \underset{(solid)\longleftarrow}{\longrightarrow} Ge_{(solid)} + GeI_{4(gas)}$$

In this reaction, the temperature should be high in the zone where the source of semiconductor material is positioned. It is at this zone that the maximum pressure of the $GeI_2$ is required, and in the substrate zone the temperature should be low to give the maximum yield of semiconductor material, that is, a high pressure of $GeI_4$. The limiting temperature differential is reached when solid $GeI_2$ or $GeI_4$ crystallizes from the vapor.

With respect to the pyrolytic type of reaction it is considered that the reaction for a silicon example may theoretically be represented by the following equation:

$$Si+2I_2 \rightleftarrows SiI_4$$

At higher temperatures, the greater fraction of the $SiI_4$ tends to return to $Si+I_2$. When the substrate is maintained at a higher temperature the silicon deposits thereon. Referring to FIGURES 1 and 1A the substrate may be heated by coils 2 surrounding the substrate 5 and the source may be reduced in temperature by reducing the power to the coil 2 surrounding 6, 7, or 8, or by switching positions of the substrate and one of the sources.

In order to aid one skilled in the art in understanding and practicing the invention, the following specific examples are provided, it being understood that the attached examples are provided only to show a starting point for one skilled in the art, and that in the light of the invention a plurality of sets of specifications may be readily visualized.

*Example A*

A quartz container of about 2.5 centimeters inside diameter and about 30 centimeters long, is loaded with a quantity of N conductivity type monocrystalline germanium serving as a substrate, a quantity of P conductivity type raw germanium serving as a source and a quantity of germanium tetra iodide ($GeI_4$) or pure iodine as a transport element. The optimum concentration for germanium tetra iodide or iodine has not definitely been established. But for the tube dimensions given above, germanium tetra iodide or iodine charges ranging from 3 milligrams to 340 milligrams are acceptable. The lower extreme gives a rather slow deposition rate, the effect of the higher extreme will be described later. The container is then placed in a furnace which has at least two separate regions of temperature. The temperature of the furnace is first raised and the substrate and the monocrystalline germanium is "etched" by keeping it about 550° C. while the source germanium is about 150° C. cooler. The "etching" requires usually about 20 minutes after which time the temperature distribution is reversed, that is the substrate is kept at about 400° C. and the source germanium is kept in the range of 500–600° C. The transported germanium deposits on the substrate and the lower the temperature the greater is the rate of deposit. Therefore when larger $I_2$ or $GeI_4$ charges are used, the temperature in the substrate region cannot be made very low because the $GeI_4$ or $GeI_2$ will condense on the deposit in the germanium giving a disrupted deposit. The disruptions may be viewed as platelets through the openings in the furnace. With the close control described, the temperature can be adjusted so that a small fraction of the $GeI_4$ deposits on the container walls while keeping the substrate above the deposition temperature when heavy concentration of $GeI_4$ or $I_2$ are used. The use of light as illustrated in connection with FIGURE 2 is of value here since the light can heat the substrate only and the substrate may be kept slightly warmer than the tube walls. With the charges of $GeI_4$ in the lower range mentioned above, the temperature in the substrate region can be maintained as low as 300° C. The container with the charges is evacuated to about $10^{-4}$ to $10^{-5}$ millimeters of mercury and either sealed off or backfilled with about 200 milliliters of hydrogen. It has been observed sometimes that the hydrogen backfilling yields germanium of greater purity. The reaction in a vacuum yields germanium of almost the same purity as the original material, but with fewer impurities which are more electropositive than is germanium. Under the conditions set forth above, at the end of 7 days, an epitaxial extension 0.05 to 0.1 inch thick of P conductivity type germanium has been placed on the substrate and formed a PN junction therewith.

*Example B*

A quartz container about 1 inch inside diamter, about 8–10 inches long was provided with about 50 grams of pure silicon as a source. Three wafers of P type silicon and three of N type silicon were placed in the tube as substrates with about 139 milligrams of iodine as a transport element. It is assumed that 15 to 20% of the iodine is lost in evacuation. The tube was backfilled with 200 milliliters of hydrogen. The substrate was maintained at approximately 800° centigrade and the source silicon was maintained at about 600° centigrade for three days. An epitaxial deposit of pure silicon was observed to be 0.002 inch deep on each substrate.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore to be limited only as indicated by the scope fo the following claims.

What is claimed is:

1. The method of forming connections to thin internal regions of semiconductor structures comprising the steps of masking said structure with an inert coating leaving exposed at least one surface in which a thin internal region of said structure is exposed and epitaxially depositing in a sealed container semiconductor material of the same conductivity type as said thin internal region on said exposed surface.

2. The method of forming connections to thin internal regions of semiconductor structures comprising the steps of masking said structure with wax leaving exposed at least one surface in which a thin internal region of said structure is exposed and epitaxially depositing in a sealed container semiconductor material of the same conductivity type as said thin internal region on said exposed surface.

3. The method of forming a structure of germanium semiconductor material comprising positioning a monocrystalline germanium substrate, a source of P conductivity type germanium, a source of N conductivity type germanium and a source of iodine each in a separate location in a sealed container, maintaining the substrate location in said container at approximately 400° C. and selectively maintaining each location of source germanium in said container in the range of approximately 500 to 600° C.

4. The method of forming a structure of silicon semiconductor material comprising positioning a monocrystalline silicon substrate, a source of N conductivity type silicon, a source of P conductivity type silicon and a source of iodine each in a separate location in a sealed container, maintaining the substrate location in said container at approximately 800° C. and selectively maintaining each location of source silicon in said container at 600° C.

5. An apparatus for the epitaxial deposition of semiconductor material to form semiconductor device bodies comprising a sealed container, means for maintaining an even temperature throughout said container and further means for providing an incremental increase in temperature in one region of said container and an incremental decrease in temperature in a separate region of said container.

6. Apparatus for performing epitaxial deposition of semiconductor material to form semiconductor device bodies comprising a sealed container having widely spaced coils of resistance heating material wound around its length, a heat retaining shield covering said container and said widely spaced coils and having openings therethrough to admit light in discrete locations and a void therein to permit a decrease in temperature, and means selectively focusing high intensity light into discrete regions in said container through said openings.

7. An apparatus for the epitaxial deposition of semiconductor material to form semiconductor device bodies comprising: a sealed container, resistance heating means for maintaining an even temperature throughout said container, and further electrical heating means for providing an incremental increase in temperature in one region of said container and an incremental decrease of temperature in a separate region of said container.

8. An apparatus for the epitaxial deposition of semiconductor material to form semiconductor device bodies comprising: a sealed container, resistance heating means for maintaining an even temperature throughout said container, and means for focusing light in one region of said container and means providing increased heat radiation by a separate region of said container.

9. Apparatus for forming semiconductor bodies by the epitaxial deposition of semiconductor material comprising in combination: a sealed container, means for maintaining an even temperature throughout said container, at least one semiconductor source site within said container, at least one semiconductor substrate site within said container, means for the local establishment of an incremental temperature increase from said even temperature at least one of said sites in said container, means for the local establishment of an incremental temperature decrease in temperature at at least one other of said sites in said container, and a vapor transportation path including a tranport vapor within said container connecting at least one of said source and said substrate sites.

10. The apparatus of claim 9 wherein a single site is provided.

References Cited in the file of this patent

UNITED STATES PATENTS

| | | |
|---|---|---|
| 2,139,640 | Mall et al. | Dec. 6, 1938 |
| 2,438,892 | Becker | Apr. 6, 1948 |
| 2,602,033 | Lander | July 1, 1952 |
| 2,701,216 | Seiler | Feb. 1, 1955 |
| 2,766,144 | Lidow | Oct. 9, 1956 |
| 2,804,405 | Derick | Aug. 27, 1957 |

UNITED STATES PATENT OFFICE
CERTIFICATE OF CORRECTION

Patent No. 3,047,438

July 31, 1962

John C. Marinace

It is hereby certified that error appears in the above numbered patent requiring correction and that the said Letters Patent should read as corrected below.

Column 3, line 47, for "raminder" read -- remainder --; column 4, line 2, for "or", second occurrence, read -- of --; line 11, for "disposition" read -- deposition --; column 5, line 5, for "tranpsorted" read -- transported --; line 53, for "loweest" read -- lowest' --; line 66, for "of" read -- or --; same column 5, line 70, for "PNP" read -- PNIP --; column 6, line 24, for "in", first occurrence, read -- is --; column 11, line 2, after "temperature", second occurrence, insert -- at --.

Signed and sealed this 4th day of December 1962.

(SEAL)
Attest:

ERNEST W. SWIDER
Attesting Officer

DAVID L. LADD
Commissioner of Patents